United States Patent [19]

Fischer et al.

[11] 4,244,980

[45] Jan. 13, 1981

[54] FLOUR COMPOSITIONS

[75] Inventors: Leonard G. Fischer, Elkridge, Md.; Peter Kovacs, Alsenberg, Belgium; Alvin W. Russell, Lawrence, N.Y.; John E. Vey, Manchester, Md.

[73] Assignees: Merck & Co., Inc., Rahway, N.J.; DCA Food Industries, Inc., New York, N.Y.

[21] Appl. No.: 795,476

[22] Filed: May 10, 1977

[51] Int. Cl.³ .............................................. A21D 2/18
[52] U.S. Cl. ..................................... 426/554; 426/19; 426/555; 426/558; 426/622
[58] Field of Search .................. 426/19, 554, 555, 558, 426/575, 622, 549, 653, 253

[56] References Cited

U.S. PATENT DOCUMENTS

| | | | |
|---|---|---|---|
| 1,626,910 | 5/1927 | Block | 426/622 X |
| 2,158,392 | 5/1939 | Ament | 426/19 |
| 2,611,704 | 9/1952 | Jaeger | 426/554 X |
| 3,015,565 | 1/1962 | Suntheimer | 426/19 |
| 3,170,796 | 2/1965 | Andre et al. | 426/554 |
| 3,219,455 | 11/1965 | Dubois | 426/19 X |
| 3,271,164 | 9/1966 | Andt | 426/19 X |
| 3,349,079 | 10/1967 | Freedman | 162/175 |
| 3,723,132 | 3/1973 | Hodge et al. | 426/554 X |

*Primary Examiner*—Esther M. Kepplinger
*Attorney, Agent, or Firm*—Gabriel Lopez; Donald J. Perrella; Julian S. Levitt

[57] ABSTRACT

Yeast-raised dough products containing 0–60% hard flour, 0–100% bleached soft wheat flour, from 0–70% bleached clear flour and, based on total amount of bleached soft wheat flour and bleached clear flour, from 0.20–1.00 part of sodium calcium alginate per 100 parts of bleached soft wheat flour and/or bleached clear flour.

16 Claims, No Drawings

FLOUR COMPOSITIONS

BACKGROUND OF THE INVENTION

1. Field of the Invention

The present invention relates to yeast-raised dough compositions. More particularly it relates to yeast-raised dough compositions containing bleached soft wheat flour or bleached clear flour, or a mixture of bleached soft wheat flour and bleached clear flour, and to the edible product prepared therefrom.

Typically large amounts of high quality protein, hard wheat flours are required for breads, sweet doughs and yeast-raised doughnuts to insure adequate gas retention and structure forming properties to provide a finished product with proper volume and eating quality. While there would be a decided economic advantage in using soft wheat flour and clear flour in yeast-raised dough compositions, it has been necessary heretofore to employ hard wheat flours to obtain the desired gas retention and structure forming properties.

2. Description of the Prior Art

U.S. Pat. No. 2,158,392 to Ament discloses that the properties of bread are improved by incorporating a soluble alginate such as sodium or ammonium alginate. The alginate imparts to bread made of low percentage gluten flour the qualities characteristic of high gluten breads.

U.S. Pat. No. 2,611,704 to Jaeger discloses an improved dry mix for use in baked products. Alginate is disclosed as one of several emulsifying agents which have been found to be very desirable in retaining the fatty material of the dry mix in dispersion during the baking operation, and especially in retaining air and gas in the mix.

U.S. Pat. No. 3,219,455 discloses a bread additive which increases low volume and improves grain, texture and keeping qualities. The additive comprises vital wheat gluten, a hydrophillic colloid and an oxidizing agent.

U.S. Pat. No. 3,271,164 discloses an additive for baked goods to retard staling. The additive comprises karaya gum and a mixture selected from algins and carageenans. The level of carageenans and algins should be no more than about 0.1%, based on the weight of the flour present.

3. Objects of the Invention

It is an object of the present invention to provide yeast-raised dough compositions having gas retention and structure forming properties comparable to those of compositions using hard wheat flours but which do not contain any hard wheat flour or which contain lesser amounts of hard wheat flour. Another object is to provide acceptable yeast-raised dough compositions wherein the flour is substantially all soft wheat flour or is substantially all a mixture of soft wheat flour and bleached clear flour. A further object is to provide a more economical method for preparing yeast-raised dough compositions. These and other objects of the present invention will be apparent from the following description.

SUMMARY OF THE INVENTION

Satisfactory yeast-raised dough products are made using less hard flour or substantially all bleached soft wheat flour or a mixture of bleached soft wheat flour and bleached clear flour. The flour portion of the composition may contain from 0 to about 60 weight % hard flour, from 0–100 weight % bleached soft wheat flour and from 0 to about 70 weight % of bleached clear flour and, per 100 parts of bleached soft wheat flour and/or bleached clear flour, from about 0.20–1.00 part of sodium calcium alginate.

DETAILED DESCRIPTION

Commercial wheats vary widely in properties depending on the variety and area where grown. They may be losely grouped into two general headings as hard and soft.

The hard wheats are the types most desirable for bread production. They mill well and yield good quantities of flour that is high in good qualities of protein, from which strong, elastic doughs can be made. These doughs have excellent gas-holding properties and will yield bread with good volume, grain, and texture under a wide range of conditions. The hard wheat doughs have high water-absorptive capacities and have excellent waterholding properties when properly matured.

The soft wheats are used primarily in the production of flour for cake, pastry, cookies, and so forth. They are characterized, for the most part, as being lower in protein and they yield flours which have low water-absorption capacities and poor tolerance to mixing and fermentation. They handle poorly in bread baking equipment.

In the milling of both hard and soft wheat there is a by-product known as "clear flour" which although containing a high level of protein, is unsuitable for use at high levels in yeast-raised dough compositions.

The present invention is based on the discovery that the addition of from about 0.20 to about 1.00 part of an alkali metal calcium alginate per 100 parts of soft flour and or clear flour, the pH of which has been reduced to about 6.0 or below, imparts to the resulting yeast-raised dough product gas retention and structure forming properties comparable to yeast-raised dough compositions made entirely with high quality hard wheat flour.

It is a requirement of the present invention that both the soft wheat flour and/or the clear flour be treated to reduce its pH to about 6.0 or lower. A preferred method of treating the flour to reduce its pH to about 6.0 or lower is to bleach the flour by means of chlorine gas. Preferably, the flour is treated to reduce the pH to from about 4.3 to about 6.0, most preferably to a pH of from about 4.5 to about 5.8.

It is another requirement of the present invention that the soft wheat flour and the clear flour each have a minimum of 6.0 weight % wheat protein, that is to say, gluten.

The alkali metal calcium alginate is preferably sodium calcium alginate but other salts such as potassium calcium alginate and ammonium calcium alginate may also be used. The mixed alkali metal calcium salts may be prepared, for example, by reacting alginic acid with an excess of a sodium salt and thereafter reacting the resulting sodium alginate with a calcium salt, or by reacting alginic acid with a calcium salt in the presence of a lower alkanol and reacting the resulting calcium alginate with a sodium salt. Alternatively, the alginate compositions may comprise finely ground calcium alginate in admixture with finely ground alkali metal alginate. The sodium calcium alginate which contains from about 5.5 to about 7.5 weight % sodium and from about 2.5 to about 3.5 weight % calcium is preferably used in a readily soluble form.

A particular application of the present invention is the preparation of yeast-raised doughnuts. A typical doughnut composition according to the present invention comprises about 100 parts by weight of flour which contains from 0 to about 60 weight % hard flour, from 0 to 100 weight % bleached soft wheat flour, and from 0 to 70 weight % bleached clear flour and, relative to the flour, from about 5 to about 8 parts by weight of sugar, from about 5 to about 6 parts by weight of a triglyceride, from about 1.5 to about 2.0 parts by weight of milk solids, from about 1.0 to about 1.5 parts by weight of monoglycerides or diglycerides or a mixture thereof, from about 1.25 to about 1.50 parts by weight of salt, from about 1.25 to about 1.50 parts by weight of chemical leavening agent, from about 0.25 part to about 1.0 part by weight of egg yolk, from about 0.15 to about 0.35 part by weight of bromate blend, and per 100 parts of bleached soft wheat flour and/or bleached clear flour, from about 0.20 to about 1.00 part of alkali metal calcium alginate.

The following examples illustrate the present invention without, however, limiting the same thereto. Unless indicated otherwise, all temperatures are expressed in degrees Celsius.

EXAMPLE 1

A yeast-raised doughnut formulation is prepared from the following ingredients:

| Ingredient | Parts by Weight |
| --- | --- |
| Soft wheat flour, bleached to pH of 5.6 | 100.0 |
| Sucrose and/or dextrose | 6.5 |
| Shortening (hydrogenated vegetable oil) | 5.5 |
| Emulsifier (mono- and digylceride mixture) | 1.25 |
| Non-fat dry milk solids | 1.75 |
| Leavening | 1.13 |
| Salt | 1.38 |
| Dried egg yolk | 0.63 |
| Sodium calcium alginate | 0.55 |
| Bromate blend containing 0.1% KBrO$_3$ | 0.25 |

The foregoing ingredients are made into a dry blend. To 100 parts by weight of this blend there are added 3.25 parts by weight of yeast followed by mixing for about 3–4 minutes, and then 50 parts by weight of water are incorporated using the low speed on a 4-speed mixer with a dough hook to insure proper wetting of the flour. After all the water is added, the dough is mixed for 2 minutes at low speed, and then mixed at third speed. This mixing is continued for 10 minutes. The dough mass is then subjected to a fermentation of about 45 minutes, cut into workable pieces weighing from about 3.6–4.5 kg. each and allowed to rest for 10–15 minutes. The dough is then made into doughnuts, either hand cut or table cut, and proofed for about 30 to 40 minutes at 46° C. dry-bulb, 32° C. wet-bulb. The uncooked doughnuts are then fried approximately 45–50 seconds on each side at a fat temperature of 191° C.

EXAMPLE 2 (CONTROL)

A typical prior art doughnut is prepared by repeating the procedure of Example 1 except that a hard wheat flour (unbleached) containing approximately 12% high-quality protein is substituted for the soft wheat flour, 42 to 46 parts by weight of water are added, and the sodium calcium alginate is omitted.

EXAMPLE 3

The procedure of Example 1 is repeated except that the soft wheat flour is unbleached, the sodium calcium alginate is omitted and only 36–39 parts by weight of water are added.

EXAMPLE 4

The procedure of Example 1 is repeated except that the soft wheat flour is unbleached.

EXAMPLE 5

The procedure of Example 1 is repeated except that the sodium calcium alginate is omitted and 39 to 41 parts of water are added.

A comparison of the properties of the doughnuts of Examples 1–5 is set forth in the following table:

TABLE

| | EXAMPLE 1 | EXAMPLE 2 | EXAMPLE 3 | EXAMPLE 4 | EXAMPLE 5 |
| --- | --- | --- | --- | --- | --- |
| Fat absorption, g/dozen | 106–128 | 99.2–113.4 | 134.7–141.7 | 134.7–141.7 | 113.4–134.7 |
| Crown+, cm/3 doughnuts | 10.8–12.1 | 11.4–12.1 | 7.3–8.9 | 8.3–9.5 | 8.9–10.2 |
| Spread++, cm/3 doughnuts | 22.9–24.8 | 24.8–26.7 | 21–21.6 | 21–22.9 | 21.6–22.9 |
| Resiliency | Moderate | Moderate | None | Poor | Slight |
| Skin Texture | Smooth | Smooth | Rough | Rough | Slightly Rough |
| Uniformity | Few Tears and Cracks | Few Tears and Cracks | Poor | Poor | Fair |
| Cell Structure | Uniform | Uniform | Irregular | Uniform | Uniform |
| Overall Product Quality | Acceptable | Acceptable | Unacceptable | Unacceptable | Unacceptable |

As seen from the foregoing data the doughnuts of Example 1 are fully comparable to the prior art doughnuts of Example 2.
+Crown is defined as the vertical height of 3 doughnuts piled atop one another and measured in centimeters.
++Spread is defined as the horizontal width of 3 doughnuts placed flat touching side to side and measured in centimeters.

EXAMPLES 6–9

A yeast-raised doughnut formulation adapted for machine extrusion is prepared from the following ingredients:

| Ingredients | Parts by Weight |
| --- | --- |
| Hard wheat flour | 61.30 |
| Dextrose | 13.73 |
| Shortening | 12.16 |
| Milk Solids | 2.11 |
| Emulsifier (mono- and diglyceride mixture) | 2.00 |
| Salt | 1.92 |
| Lowfat soy flour | 1.51 |
| Lecithin | 1.18 |
| Potato flour | 1.15 |
| Sodium acid pyrophosphate | 0.63 |
| Dough conditioner (Paniplus ®) | 0.60 |
| Sodium bicarbonate | 0.38 |
| Bromate blend containing 0.1% KBrO$_3$ | 0.34 |
| Malted barley flour | 0.27 |

To 100 parts by weight of a dry blend of the foregoing ingredients there are added 100 parts by weight of the test flour. The resulting mix is blended and aged for 24 hours. To the aged blend there is added 5% yeast based on weight of dry mix, and then 50 parts by weight of water are incorporated using the low speed on a 4-speed mixer with a dough hook to insure proper wetting of the flour. After all the water is added, the dough is mixed for 1 minute at low speed, and then for 10 minutes using the No. 3 speed. The dough mass is then fermented for 15–20 minutes and extruded from a Doco mechanical cutter fitted with 1.25 inch cutters and a scalling weight of 10 to 11 ounces per dozen. The doughnuts are proofed for about 30 to 40 minutes at 46° C. dry bulb, 32° C. wet bulb and then fried approximately 45–50 seconds on each side at a fat temperature of 191° C.

The foregoing procedure is repeated except that in Examples 7–9 0.6 part of sodium calcium alginate is added to 100 parts of the test flour which is then added to the dry blend in lieu of the 100 parts of hard flour:

| Example | Type of Flour | % of Test Flour | | |
|---|---|---|---|---|
| | | Hard | Soft | Clear |
| 6 (Control) | Hard Wheat | 100 | 0 | 0 |
| 7 | Bleached soft wheat | 0 | 100 | 0 |
| 8 | Bleached clear | 0 | 0 | 100 |
| 9 | Blend of soft wheat and clear | 0 | 50 | 50 |

Satisfactory doughnuts are obtained in each case.

EXAMPLES 10–12

The procedure of Example 1 is repeated except that the soft wheat flour is replaced by 100 parts of the following blends of bleached soft wheat flour and bleached clear flour:

| Example | % Flour Type | |
|---|---|---|
| | Soft | Clear |
| 10 | 35 | 65 |
| 11 | 50 | 50 |
| 12 | 80 | 20 |

Satisfactory doughnuts are obtained in each case.

What is claimed is:

1. In a yeast-raised dough composition containing a soft wheat flour or a clear flour, the amount of soft wheat flour being up to 100 weight % of the total flour and the amount of clear flour being up to about 70 weight % of the total flour, the improvement wherein the pH of the soft wheat flour and of the clear flour is reduced to about 6.0 or below, and wherein the composition contains from about 0.20 to about 1.00 part of alkali metal calcium alginate per 100 parts of soft wheat flour and/or clear flour in the composition.

2. A composition according to claim 1 wherein the alkali metal calcium alginate is sodium calcium alginate.

3. A composition for preparing a yeast-raised dough composition comprising (1) flour wherein the flour from 0 to about 60 weight % hard flour, from 0 to 100 weight % bleached soft wheat flour, and from 0 to about 70 weight % bleached clear flour, the bleached flour having a pH of about 6.0 or below, and (2) from about 0.20 to about 1.00 part of an alkali metal calcium alginate per 100 parts of the bleached soft wheat flour and/or bleached clear flour in the flour portion of the composition.

4. A composition according to claim 3 which contains from about 40 to about 60 weight % hard flour, the balance of the flour being a bleached soft wheat flour or a bleached clear flour, or a mixture of a bleached soft wheat flour and a bleached clear flour.

5. A composition according to claim 4 wherein the bleached flour has a pH of from about 4.3 to about 6.0.

6. A composition according to claim 4 wherein the bleached flour has a pH of from about 4.5 to about 5.8.

7. A composition according to claim 4 wherein the alkali metal calcium alginate is sodium calcium alginate.

8. A composition for preparing a yeast-raised dough composition comprising (1) flour, wherein the flour is from about 30 weight % to about 100 weight % of bleached soft wheat flour, from 0 up to about 70 weight % of bleached clear flour, and (2) per 100 parts of the bleached soft wheat flour and bleached clear flour, from about 0.20 to about 1.00 part of alkali metal calcium alginate.

9. A composition according to claim 8 wherein at least about 50 weight % of the flour is bleached soft wheat flour.

10. A composition according to claim 8 wherein at least about 90 weight % of the flour is bleached soft wheat flour.

11. A composition according to claim 10 wherein substantially all of the flour is soft wheat flour.

12. A composition according to claim 8 which contains from about 30 weight % to about 50 weight % bleached soft wheat flour and from about 70 weight % to about 50 weight % flour of bleached clear flour.

13. A composition according to claim 8 wherein the alkali metal calcium alginate is sodium calcium alginate.

14. A composition for preparing a yeast-raised dough composition, comprising about 100 parts by weight of flour, at least part of the flour being a soft wheat flour and, relative to the flour, from about 5 to about 8 parts by weight of sugar, from about 5 to about 6 parts by weight of a triglyceride, from about 1.5 to about 2.0 parts by weight of milk solids, from about 1.0 to about 1.5 parts by weight of monoglycerides or diglycerides or a mixture thereof, from about 1.25 to about 1.50 parts by weight of salt, from about 1.0 to about 1.25 parts by weight of chemical leavening agent, from about 0.25 part to about 1.0 part by weight of egg yolk, from about 0.15 to about 0.35 part by weight of bromate blend, and from about 0.20 to about 1.00 part of sodium calcium alginate per 100 parts of soft wheat flour.

15. A composition according to claim 14 wherein at least about 50 weight % of the flour is soft wheat flour.

16. A composition according to claim 14 wherein at least about 90 weight % of the flour is soft wheat flour.

* * * * *

UNITED STATES PATENT AND TRADEMARK OFFICE
CERTIFICATE OF CORRECTION

PATENT NO. : 4,244,980

DATED : January 13, 1981

INVENTOR(S) : Leonard G. Fischer et al

It is certified that error appears in the above—identified patent and that said Letters Patent is hereby corrected as shown below:

In Claim 3, line 3, insert the word -- is -- before the words "from 0 to about 60 weight % hard flour, from 0 to 100..." .

Signed and Sealed this

Twenty-eighth Day of April 1981

[SEAL]

Attest:

RENE D. TEGTMEYER

Attesting Officer

Acting Commissioner of Patents and Trademarks